US011112275B2

(12) United States Patent
Bertin

(10) Patent No.: US 11,112,275 B2
(45) Date of Patent: Sep. 7, 2021

(54) DEVICES, SYSTEMS AND METHODS FOR DETERMINING AND COMPENSATING FOR OFFSET ERRORS ARISING IN INDUCTIVE SENSORS

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/112,221

(22) Filed: Aug. 24, 2018

(65) Prior Publication Data

US 2020/0064159 A1  Feb. 27, 2020

(51) Int. Cl.
*G01D 5/20* (2006.01)
*G01L 3/10* (2006.01)

(52) U.S. Cl.
CPC ............ *G01D 5/2073* (2013.01); *G01L 3/105* (2013.01)

(58) Field of Classification Search
CPC .............................. G01D 5/2073; G01L 3/105
See application file for complete search history.

(56) References Cited

U.S. PATENT DOCUMENTS

| 8,453,518 | B2  | 6/2013  | Diekmann |           |
|-----------|-----|---------|----------|-----------|
| 9,528,858 | B2* | 12/2016 | Bertin   | G01D 5/2086 |
| 2006/0066167 | A1* | 3/2006 | Saito | B60L 50/15 |
|           |     |         |          | 310/201   |
| 2006/0233123 | A1 | 10/2006 | Lee |            |
| 2009/0133867 | A1* | 5/2009 | Kuckes | E21B 41/0085 |
|           |     |         |          | 166/65.1  |
| 2010/0319467 | A1* | 12/2010 | Diekmann | G01L 5/221 |
|           |     |         |          | 73/862.332 |
| 2014/0055000 | A1 | 2/2014 | Adra |            |
| 2016/0273945 | A1 | 9/2016 | Olsak |           |
| 2017/0166251 | A1 | 6/2017 | Shao et al. |       |

(Continued)

OTHER PUBLICATIONS

U.S. Appl. No. 15/802,000, Notice of Allowability dated Jun. 12, 2019.

(Continued)

*Primary Examiner* — Farhana A Hoque
(74) *Attorney, Agent, or Firm* — Wash Park IP Ltd.; John T. Kennedy

(57) ABSTRACT

Devices, systems, and method for detecting, determining and compensating for offset error arising in inductive position and torque sensors are described. In accordance with at least one embodiment, an offset coil can be configured for use within an inductive sensor and include a first trace and at least one second trace. The first trace and the at least one second trace may be drawn within a stator of an inductive sensor. The first trace and the at least one second trace may be drawn within the stator proximate to a pair of excitation coil connecting leads, drawn on a first plane within the stator, and on at least one plane substantially parallel to the first plane such that wherein an excitation coil flowing through the pair of excitation coil connecting leads induces an offset coil signal in the first trace and at least second trace.

20 Claims, 11 Drawing Sheets

(56) References Cited

U.S. PATENT DOCUMENTS

2019/0072414 A1\* 3/2019 Utermoehlen ....... G01D 5/2053
2019/0097501 A1 3/2019 Lin et al.

OTHER PUBLICATIONS

Jacques Jean Bertin, "Inductive Position Sensor", U.S. Appl. No. 16/561,390, filed Sep. 5, 2019.
U.S. Appl. No. 15/949,762, non-final Office Action, dated Apr. 22, 2020.
CN Application Serial No. 201910727721.5, Application filed Aug. 8, 2019.
U.S. Appl. No. 15/949,762, RCE, dated Nov. 12, 2020.
U.S. Appl. No. 15/949,762, non-final Office Action, dated Dec. 23, 2020.
U.S. Appl. No. 15/949,762, Response to non-final Office Action, dated Jul. 9, 2020.
U.S. Appl. No. 15/949,762, Final Office Action, dated Oct. 9, 2020.
U.S. Appl. No. 15/949,762, filed Apr. 10, 2018.
U.S. Appl. No. 16/561,390, filed Sep. 5, 2019.
U.S. Appl. No. 16/561,390, Non-final Office Action, dated May 7, 2021.
U.S. Appl. No. 15/949,762, Response to non-final Office Action, dated Mar. 12, 2021.
U.S. Appl. No. 15/949,762, Notice of Allowance, dated Jun. 2, 2021.

\* cited by examiner

DEVICES, SYSTEMS AND METHODS FOR DETERMINING AND COMPENSATING FOR OFFSET ERRORS ARISING IN INDUCTIVE SENSORS

TECHNICAL FIELD

The technology described herein generally relates to devices, systems, and methods for determining the angular or linear position of and/or torque exerted on an object. More specifically, the technology described herein generally relates to electronic devices, systems, and methods which utilize electromagnetic principles, such as inductance, to determine an angular or linear position of and/or torque exerted on an object.

BACKGROUND

Position sensing devices, including inductive position sensors, inductive torque sensors, and the like are widely used today. Various uses include, but are not limited to, automobiles and other vehicles, factory settings, personal products, and otherwise. Inductive position sensors are often used to determine the position of an object, such as brake pedal, a throttle, or otherwise, hereafter defined as a "target." Inductive torque sensors are often used today to measure the torque imparted onto an object. Both inductive sensors and inductive torque sensors typically include one or more excitation coils configured to generate one or more electromagnetic fields when electrical current flows through the coil, and one or more receiving coils configured to detect an electrical potential, a voltage, induced in the receiving coil(s) by the currents flowing through the excitation coil, and a rotor. The rotor may include one or more coils itself and may be configured to have symmetry with the coil patterns utilized in the receiving coil(s). The rotor is configured to disturb the amount of electrical potential induced in the receiving coil(s) based on the rotor's position. The rotor is typically attached, directly or indirectly, to the target, such that as a target's position changes and/or as a torque is applied, the rotor's relative position also changes. Such changes in the position of the rotor, in turn, uniquely disturb the voltages induced in the receiving coil(s) such that the position of the rotor, and thereby the target, can be determined based on the changes in the electrical potential induced in the receiving coil(s). In short, a rotor can be defined to affect the inductive coupling between the excitation coil(s) and the receiving coil(s) by mathematical functions (each a "transfer function"). Circuitry is connected to a receiving coil to detect and determine a rotor's relative position and/or the torque exerted thereon based on the relative amplitudes and changes thereof induced in the receiving coil(s).

One example of a known inductive position sensor is described in U.S. Pat. No. 9,528,858, which issued on Dec. 27, 2016, in the name of inventor Jacques Bertin, and entitled "Inductive Sensor," the entire contents of which are incorporated herein by reference. Another example of a known inductive position sensor is described in U.S. patent application Ser. No. 15/802,000, filed on Nov. 22, 2017, in the name of inventor Jacques Bertin, and entitled "Inductive Position Sensor," the entire contents of which are incorporated herein by reference. An example of a known inductive torque sensor is described in U.S. patent application Ser. No. 15/949,762, filed on Apr. 10, 2018, in the name of inventor Jacques Bertin, and entitled "Differential Position and Torque Sensor," the entire contents of which are incorporated herein by reference.

As described in the above referenced patents and applications, and as shown for example in FIGS. 1 and 2, inductive sensors 100 typically include a stator 102, often made using a PCB or similar materials, on which are drawn one or more excitation coils 104. The excitation coils may be drawn in circular patterns, across one or more layers of the PCB and are desirably configured to generate electromagnetic fields which extend perpendicularly from a top surface of the stator 102 (where the top surface is opposite a rotor). When a current is flowing through the excitation coils 104, the excitation coils 104 are inductively coupled to one or more rotor coils (as shown by second electromagnetic field 116 in FIG. 2). The rotor coils 118 may have any desired configuration.

The excitation coils 104 often surround one or more receiver coils 106, such as coils 106-1, 106-2 and 106-3, which are shown collectively in FIG. 1 and individually in FIG. 2. The receiving coils 106 may be configured into two-phase, three-phase, or other desired configurations, with either two-phase or three-phase configurations being commonly utilized. Each receiver coil 106 may have a twisted loop design, with alternating clockwise and counter-clockwise patterns (the "twisted loop"). However, other design patterns may be used. The clockwise and counter-clockwise loops are commonly provided in symmetrical patterns. It is to be appreciated, that the twisted loop design results in receiving coils which have minimal, if any, electricity induced in such receiving coils due to the electromagnetic fields generated by turns of the surrounding excitations coils. Essentially, the field patterns from the excitation coils are negated by the twisted loop design of the receiving coils and thereby the voltages induced in the receiving coils 106 arise due to the then arising position of a rotor 118, as shown by the first electromagnetic fields 114-1, 114-2 and 114-3.

However, each of the excitation coils 104 and each of the receiving coils 106 are commonly connected by one or more connecting leads, such as receiving coil leads 108 and excitation coil leads 109, to an integrated circuit 122 ("IC") for signal processing. Terminals for the IC are represented in FIG. 2 by designators X1, X2, etc. (designating excitation coil terminals) and R0, R1, R2, etc. (designating receiving coil terminals). Commonly, the receiving coil connecting leads 108 cross the excitation coil(s) 104 and/or excitation coil connecting leads 109 at other than 90 degrees. Such substantially non-perpendicular crossings result in one or more asymmetrical regions 120 arising where a direct coupling occurs between the excitation coils 104 and the receiving coils 106. Such direct coupling induces voltages in the signals provided by the receiving coils to the IC when currents flow through the excitation coil(s) 104. These non-ideal crossings and resulting direct couplings are illustrated in FIG. 2 by field lines 110 and are further schematically represented by inductive elements 112. Each of these direct couplings 110 are commonly unique to each given excitation coil-to-receiving coil pairing and induce an offset in the measured voltages provided by each receiving coil to the IC. These offsets arise independent of the position of a rotor, any air gaps, vertical distance of a PCB structure, or otherwise, and should be compensated in order for the IC to generate accurate readings.

Today, ICs can be programmed to so compensate for such offsets if the amplitude of the excitation current can be independently measured. However, direct access to such excitation currents is not commonly possible. So, during testing and programming of an IC, the rotor is often removed from the sensor and ideally a near constant excitation current is generated and flows through the excitation coils. This ideal near-constant excitation current induces the measured voltage in each receiving coil (the "offset"), which can then be subtracted from voltages received when the sensor is in use and the receiving coils are inductively coupled to the rotor. However, this approach is not very accurate, as ideal conditions commonly do not arise. And, today's approach often amounts to a guessing of the value of the offset to use for a given coil of a given inductive sensor design. Accordingly, a needs exists for a device, method and system for measuring and compensating for the offset induced in an inductive sensor due to the direct coupling arising between excitation coils and receiving coils in asymmetric regions.

Further, some implementations of inductive sensors are based on 2-phase systems, while other implementations are based on 3-phase systems. This often results in a need for different IC interfaces and designs. Thus, a need exists for an inductive sensor which, regardless of whether a two-phase or a three-phase system is used, integrates with a single IC design configured to process the different offsets arising as well as configurable to switch between 2-phase versus 3-phase system designs.

Further, unless receiving coils are precisely drawn, amplitude mismatches may arise between voltages induced by a rotor in respective receiving coils. Accordingly, a need exists for a device, method and system configured to compensate for amplitude mismatches arising in receiving coils due to non-ideal receiving coil designs.

Further, for two-phase systems, the receiving coils need to be ideally drawn and aligned, relative to each other, at 90-degree orientations, while for three-phase systems the receiving coils need to be ideally drawn and aligned, relative to each other, at 120-degree orientations. However, in the real-world, coils are not ideally drawn. These non-ideal conditions can induce orthogonality errors in voltages induced in the receiving coils by the rotor. It is to be appreciated that concerns with orthogonality errors are more common in linear and other non-circular sensor designs. Accordingly, a need exists for a device, method and system configured to calibrate and compensate for orthogonality errors arising in receiving coils due to non-ideal receiving coil alignments.

Last, a need commonly exists to zero position a rotor. Typically, the zero position is not known and is determined, upon sensor assembly, by mechanically adjusting a set screw or similar element until a zero position is set. This approach, however, suffers from drift during use and other concerns arising over time and commonly requires a skilled technician to periodically zero position an inductive sensor. Accordingly, a need exists for a device, method and system configured to electronically zero position calibrate an inductive sensor.

SUMMARY

The various embodiments of the present disclosure relate in general to inductive sensors and systems and methods for manufacturing and use thereof. In accordance with at least one embodiment of the present disclosure an inductive sensor includes a rotor and a stator that includes an excitation coil electrically connected to an integrated circuit by an excitation coil connecting lead, a first receiver coil electrically connected to the integrated circuit by a first set of receiving coil connecting leads, a second receiver coil electrically connected to the integrated circuit by a second set of the receiving coil connecting leads, and an offset coil pattern forming an offset coil electrically connected to the integrated circuit. For at least one embodiment and during operation of an inductive sensor, a first inductive coupling arises between the rotor and the excitation coil, a second inductive coupling arises between the rotor and the first receiver coil, a third inductive coupling arises between the rotor and the second receiver coil, and an asymmetric region is formed on the stator. Within the asymmetric region, a first direct coupling may arise between the first set of receiving coil connecting leads and the excitation coil, a second direct coupling may arise between the second set of receiving coil connecting leads and the excitation coil, and an offset coupling may arise between the offset coil pattern and the excitation coil connecting leads.

For at least one embodiment, the inductive sensor may include an integrated circuit that includes four terminals, where a first set of receiving coil connecting leads and a second set of receiving coil connecting leads may be connected to unique sets of two of the four terminals. The inductive sensor may include an integrated circuit that includes four terminals and the offset coil pattern may be uniquely connected to two of the four terminals.

The inductive sensor may include an integrated circuit that includes four terminals. The first receiving coil, the second receiving coil and the offset coil may be electrically connected to the four receiving terminals using a first configuration, wherein the first receiving coil and the offset coil are electrically connected to a second of the four receiving terminals and the second receiving coil and the offset coil are electrically connected to a third of the four receiving terminals. For at least one embodiment, the first receiving coil, the second receiving coil, and the offset coil may be electrically connected to the four receiving terminals using a second configuration, wherein the first receiving coil, the second receiving coil, and the offset coil, at a common node, are electrically connected to a second of the four receiving terminals and the offset coil is electrically connected to a fourth of the four receiving terminals. The first configuration may provide a differential sensor configuration and the second configuration may provide a single ended inductive sensor configuration.

For at least one embodiment, the inductive sensor may include an integrated circuit configured to receive a first signal at a first of the four receiving terminals, receive a second signal at a second of the four receiving terminals, receive a third signal at a third of the four receiving terminals, and receive a fourth signal at a fourth of the four receiving terminals. For at least one configuration of the inductive sensor, the first signal versus the second signal may indicate a first difference induced in the first receiving coil by a second inductive coupling and a first direct coupling. A third signal versus a fourth signal may indicate a second difference induced in a second receiving coil by a third inductive coupling and a second direct coupling. A second signal versus a third signal may indicate an offset difference induced by an offset coupling. And, a first signal versus a second signal may indicate a first difference, while a second signal versus a third signal indicates a second difference, and the second signal versus a fourth signal indicates an offset difference.

For at least one embodiment, an inductive sensor may include an integrated circuit configured to determine a then arising position of the rotor using an equation wherein a first argument of the equation is a summation of a first weighting times a first difference, a second weighting times a second difference, and a third weighting times an offset difference.

The second argument of the equation may include a summation of a fourth weighting times the first difference, a fifth weighting times the second difference, and a sixth weighting times the offset difference. Each of the first weighting, second weighting, third weighting, fourth weighting, fifth weighting and sixth weighting may be optimized constants determined, for example, over a full range of motion associated with a rotor, based upon a plurality of first voltages induced in the first receiving coil, a plurality of second voltages induced in a second receiving coil, and a plurality of offset voltages induced in an offset coil. Each of the plurality of first voltages and second voltages may be a function of rotor position. For at least one embodiment, rotor position has a negligible influence on each of the plurality of offset voltages, and the offset coupling has a dominant influence on each of the plurality of offset voltages. For at least one embodiment, the offset coil pattern may include a double barrel pattern or a twisted loop pattern.

For at least one embodiment, an inductive sensor may include a stator having a rotor facing surface, excitation coil connecting leads drawn and extending within the stator on a first plane and substantially parallel to the rotor facing surface, and an offset coil having a first offset coil pattern drawn within the stator and on at least one second plane substantially parallel with the first plane. For at least one embodiment, the excitation coil connecting leads may be drawn in a twisted configuration, and the first offset coil pattern may be drawn in a twisted loop configuration. The excitation coil connecting leads may be configured to electrically connect an integrated circuit to an excitation coil drawn on the stator. For at least one embodiment, the stator may include a first receiving coil electrically connected to the integrated circuit by a first set of terminals selected from a group of receiving coil terminals that include a first receiving coil terminal, a second receiving coil terminal, a third receiving coil terminal, and a fourth receiving coil terminal. The stator may also include a second receiving coil electrically connected to the integrated circuit by a second set of terminals selected from the group of receiving coil terminals. The offset coil pattern may be connected to the integrated circuit using a third set of terminals selected from the group of receiving coil terminals. Each of the first set of terminals, the second set of terminals and the third set of terminals may utilize a common terminal selected from the group of receiving coil terminals. For at least one embodiment, the offset coil may include a second offset coil pattern drawn within the stator and on at least one third plane substantially parallel with the first plane. The first offset coil pattern may be electrically coupled to the second offset coil pattern. The first offset coil pattern and the second offset coil pattern may form a double loop offset coil pattern.

For at least one embodiment, an offset coil, for use within an inductive sensor, may include a first trace and at least one second trace. The first trace and the at least one second trace may be drawn within a stator of an inductive sensor. Each of the first trace and the at least one second trace may be drawn proximate to a pair of excitation coil connecting leads, drawn on a first plane within the stator, and on at least one plane substantially parallel to the first plane. An excitation coil flowing through the pair of excitation coil connecting leads may induce an offset coil signal in the first trace and at least second trace. The first trace and the at least one second trace may form an offset coil pattern configured into at least one of a double barrel loop configuration and a twisted loop configuration.

BRIEF DESCRIPTION OF THE DRAWINGS

The features, aspects, advantages, functions, modules, and components of the devices, systems and methods provided by the various embodiments of the present disclosure are further disclosed herein regarding at least one of the following descriptions and accompanying drawing figures. In the appended figures, similar components or elements of the same type may have the same reference number, such as 110, with an additional alphabetic designator, such as 110-1A, 110-1B, etc., wherein the alphabetic designator indicates that the components bearing the same reference number, e.g., 110, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems, and methods for determining and compensating for the offset errors induced in inductive sensors due to direct coupling of excitation coil connecting leads with one or more leads for receiving coils. The various embodiments described herein are also directed to devices, systems, and methods for inductive sensors which, regardless of whether a two-phase or a three-phase system is used, integrate with a single IC design configured to operate with and be switchable to operate with 2-phase versus 3-phase inductive sensor designs. The various embodiments described herein are also directed to devices, methods and systems configured to compensate for amplitude mismatches arising in receiving coils due to non-ideal receiving coil designs. The various embodiments described herein are also directed to devices, methods and systems configured to calibrate and compensate for orthogonality errors arising in receiving coils due to non-ideal receiving coil alignments. The various embodiments described herein are also directed to devices, methods and systems configured to electronically zero position calibrate an inductive sensor.

Figure 1:
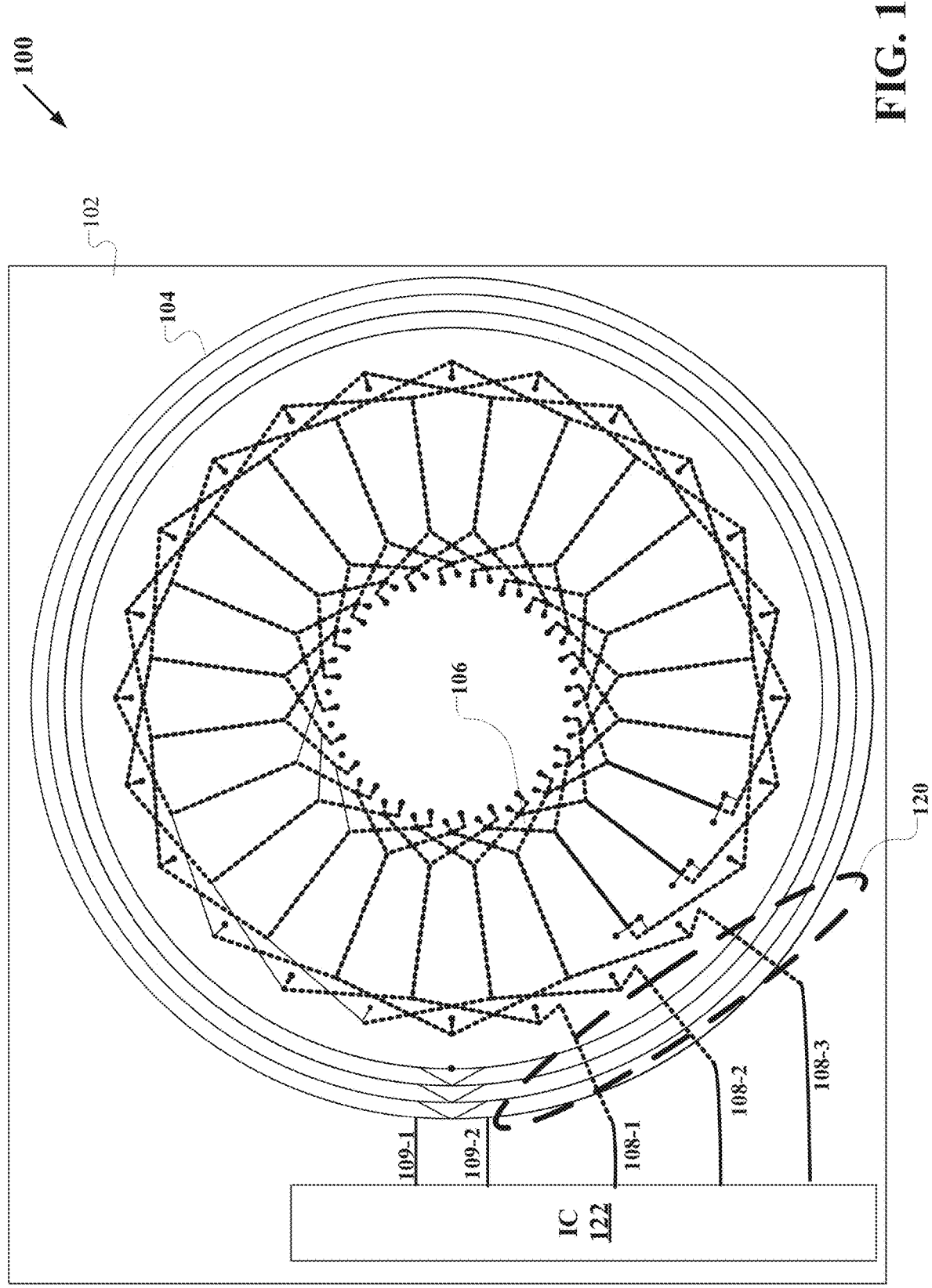
FIG. 1 is schematic representation of a top view of a stator used in conjunction with one or more conventional inductive position and/or torque sensors.
Figure 2:
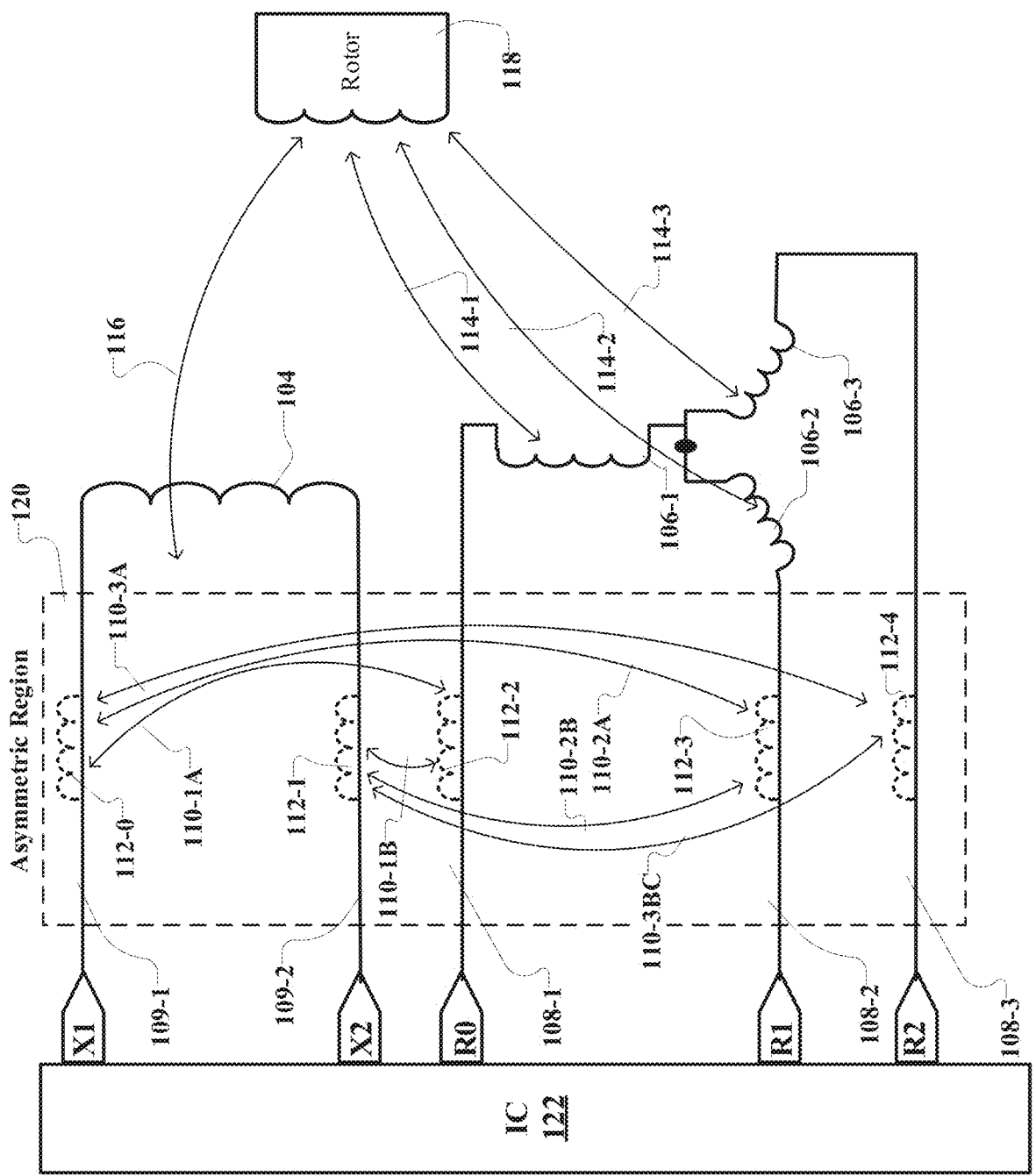
FIG. 2 is schematic representation of the inductive couplings commonly arising between connecting leads of receiving coils with an excitation coil and inductive couplings arising between a rotor, the excitation coil and the receiving coils.
Figure 3A:
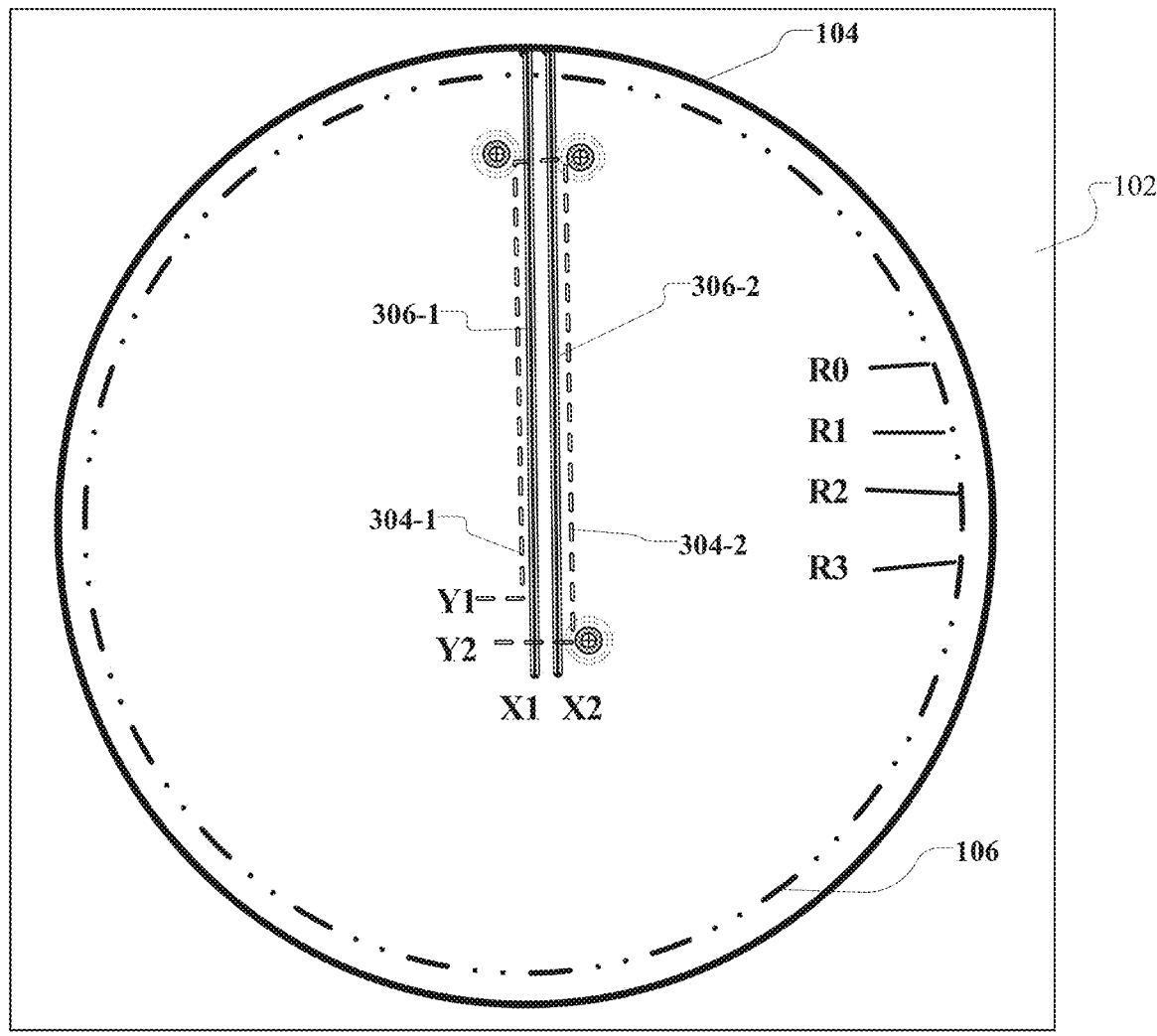
FIG. 3A is a pictorial representation of an inductive sensor showing the drawing of an offset coil onto a stator and in accordance with at least one embodiment of the present disclosure.

As shown in FIG. 3A, for at least one embodiment, an excitation coil 104 may be drawn on a stator 102. It is to be appreciated that the excitation coil 104 may include one or more traces and that only one trace is shown in FIG. 3A for purposes of clarity. Further, one or more receiving coils 106 may be drawn on the stator 102. Such receiving coils may be drawn in any desired configuration, with only one representative loop being used to illustrate such receiving coils in FIG. 3A. The receiving coils may be connected to an integrated circuit by one or more receiving coil terminals, which are illustrated in FIG. 3A by terminals R0-R3. As further shown, the excitation coil 104 may also be connected to an integrated circuit by excitation coil connecting leads 306-1 and 306-2 and terminals X1 and X2.

As further shown in FIG. 3A, an offset coil may be drawn by using one or more offset coil patterns, such as offset coil patterns 304-1 and 304-2. The offset coil may be connected to the integrated circuit by first offset coil terminal Y1 and second offset coil terminal Y2. As discussed further below, such offset coil patterns may be drawn in various configurations, such as double barrel loop, twisted pair, or otherwise. The offset coil patterns drawn so as to be substantially parallel with the excitation coil connecting leads 306-1/306-2.

Figure 3B:
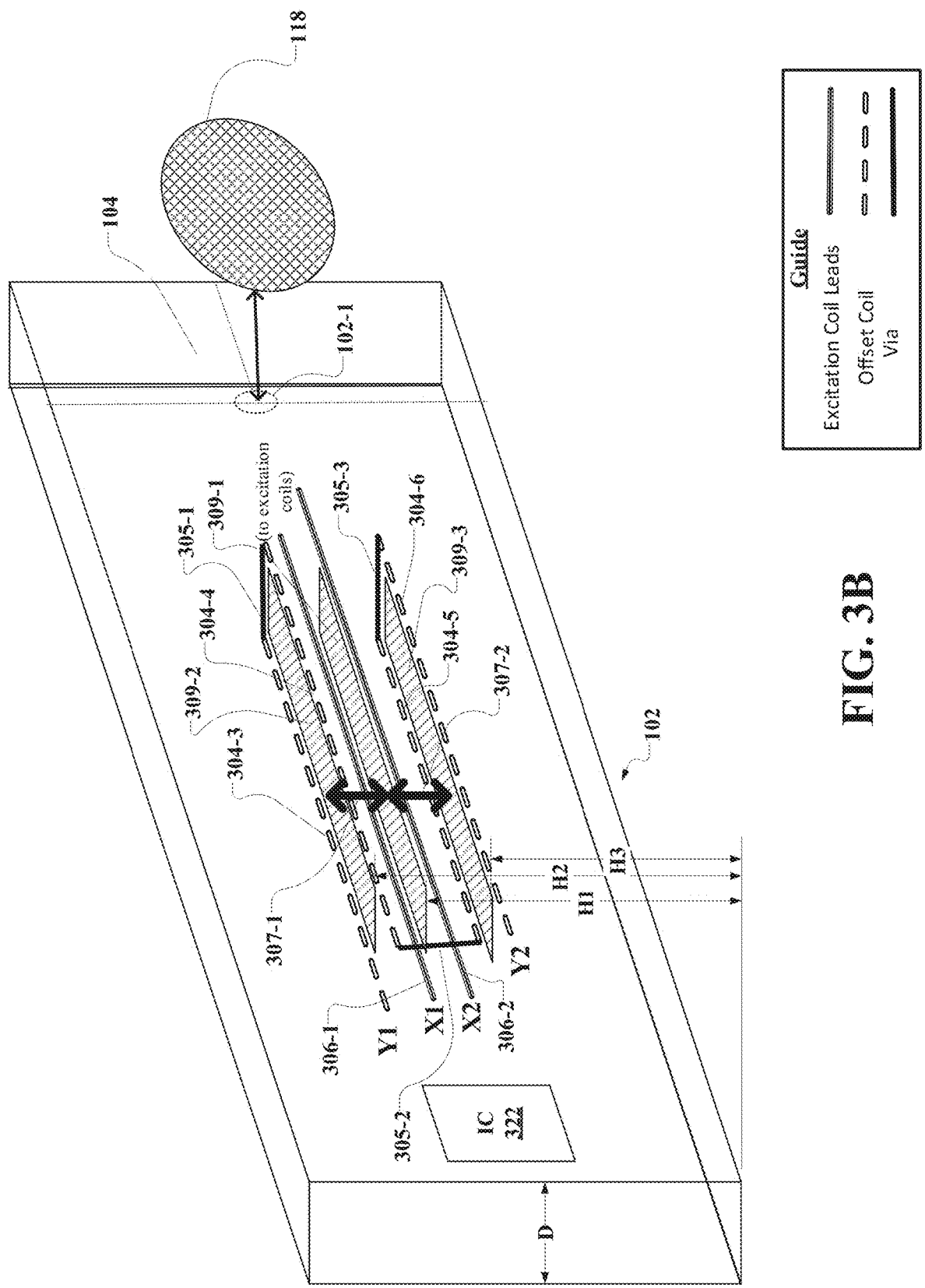
FIG. 3B is a pictorial representation of an inductive sensor showing the drawing of an offset coil in a double barrel loop configuration and in accordance with at least one embodiment of the present disclosure.

As shown in FIG. 3B and for at least one embodiment, an offset coil may be drawn, through a stator 102, in an offset coil pattern including a first coil pattern and a second coil pattern, wherein the first and second coil patterns form a double loop offset coil pattern, as depicted by offset coil double loop traces 304-3 and 304-4 which form a first offset coil pattern and offset coil double loop traces 304-5 and 304-6 which form a second offset coil pattern. Vias 305-1, 305-2, and 305-3 interconnect the traces and offset coil patterns. The excitation coil connecting leads may be drawn within the stator 102 on a first plane 309-1 arising at a height H1 from an edge of the stator. The first and second barrel loops may be drawn through the stator 102 so as to be disposed in a second plane 309-2 and a third plane 309-3 that are substantially parallel with and respectively disposed at heights H2 and H3, above and below the first plane 309-1 through which the excitation coil connecting leads 306-1/306-2 are drawn. As shown by field lines 307-1 and 307-2, the offset coil is drawn such that electromagnetic coupling may arise between the double loop traces and the excitation coil connecting leads. The patterns and leads respectively used for each of the offset coil double loop pattern and the excitation coil connecting leads may also be respectively drawn at substantially similar depths ("D") in the stator.

Figure 3C:
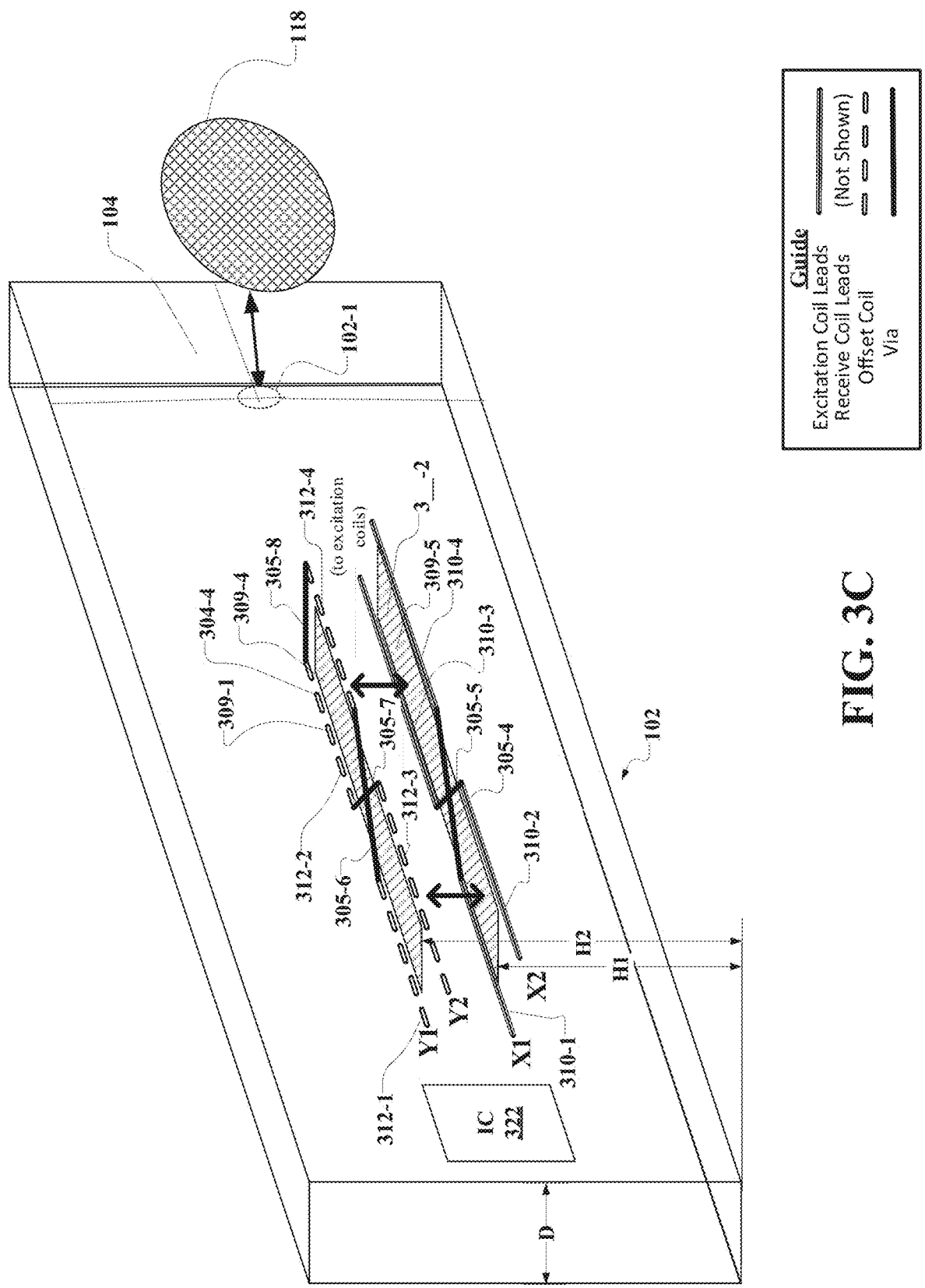
FIG. 3C is a pictorial representation of an inductive sensor showing the drawing of an offset coil in a twisted loop configuration and in accordance with at least one embodiment of the present disclosure.

As shown in FIG. 3C and for at least one embodiment, excitation coil connecting leads may be drawn in a twisted configuration, as illustrated by excitation coil twisted connecting leads 310-1, 310-2, 310-3 and 310-4, which may be interconnected by vias 305-4 and 305-5. As further shown, an offset coil may be drawn as an offset coil pattern having a twisted loop configuration, as illustrated by offset coil connecting lead traces 312-1, 312-2, 312-3 and 312-4, which may be interconnected by vias 305-6, 305-7, and 305-8. As further shown, an offset coil twisted loop pattern may be drawn about a fourth plane 309-4 situated at a height ("H") above (or below) a fifth plane 309-5 about which the twisted excitation coil connecting leads are drawn. The patterns and leads respectively used for each of the offset coil twisted loop pattern and the excitation coil twisted connecting leads may also be drawn at substantially the same depth ("D") in the stator.

As further shown in FIGS. 3B and 3C, the offset coil and the excitation coil connecting leads are drawn such that they proceed through a stator 102 substantially perpendicular to a rotor 118—the rotor being positioned so as to be parallel to the rotor facing surface 102-1 of the stator 102. The excitation coil 104 (only one coil being shown in FIG. 3A for purposes of explanation only) may be drawn in a linear (as shown in FIG. 3B) or twisted-loop (as shown in FIG. 3C) design and through the stator 102 so as to effectively provide one or more inductive coils that are parallel to the rotor 118. An offset coil can be formed by drawing offset coil patterns 304-1 and 304-2 through the stator 102 in the barrel loop, twisted-loop or other configurations. The offset coil patterns, however drawn, may be positioned proximate to the excitation coil connecting leads 306-1 and 306-2. It is to be appreciated that when the offset coil patterns and excitation coil connecting leads are drawn non-perpendicularly, and ideally substantially parallel, to each other, an inductive coupling is formed therebetween.

Further, the offset coil patterns and excitation coil connecting leads may be drawn so as to be substantially perpendicular to the excitation coils 104, the receiver coils (not shown) and the rotor 118, such that little, if any, inductive coupling arises in the offset coil due to the fields formed in the, otherwise substantially perpendicular thereto, excitation coil 104, receiving coils, and the rotor 118. Electromagnetic coupling and/or interference by the excitation coils 104, receiving coils 106, and the rotor 118 on the voltages induced in the offset coil patterns due to current flowing through the excitation coil connecting leads can thus be minimized. Further, by use of a barrel loop or twisted loop design, electromagnetic interference by other external electromagnetic signals can be negated and, at a minimum minimized to a typically negligible level.

For at least one embodiment, offset coil patterns and excitation coil connecting leads are deemed to be substantially perpendicular when drawn to be within five degrees of perpendicularity to the plane formed by the rotor facing surface 102-1 of the stator 102. In short, from this configuration, the effect of the direct coupling between the excitation coil(s) 104 and the receiving coils 106, due to the asymmetric region being formed, can be determined based on the voltages induced in the offset coil patterns due to their parallel and proximate relationship with the excitation coil connecting leads.

For at least one embodiment, offset coil patterns are drawn such that the voltage signals induced in the offset coil formed by such offset coil patterns has a value comparable to those voltages induced by the rotor 118 in the receiving coils 106. It is to be appreciated that the closer the offset coil patterns are drawn to the excitation coil connecting leads the larger will be the induced voltage in the offset coil formed by the patterns. Accordingly, by adjusting one or more of the length of the offset coil patterns and the relative distance between such patterns and the excitation coil connecting leads the magnitude of the voltages induced in the resulting offset coil may be adjusted. Further, the resolution of an inductive sensor may be varied based on the resolution permitted by a given PCB design. In accordance with at least one embodiment, the peak amplitude of the offset coil is configured, by the length and proximity of the offset coil patterns to the excitation coil connecting leads so as to be within 10× of the peak amplitude induced in the receiving coils by the rotor.

For at least one embodiment, the offset coil patterns may be drawn in the asymmetric region. In other embodiments, the offset coil patterns may be drawn outside of the asymmetric region and in closer proximity to terminals (not shown) for the IC 322. In other embodiments, the offset coil patterns may be drawn wherever practical, provided negligible, if any, voltages are induced in the offset coil due to any inductive couplings with the rotor 118. It is to be appreciated that electromagnetic shielding and other techniques known in the art may be used to isolate the offset coil relative to the rotor and/or the other receiving coils.

The offset coil may be formed by drawing offset coil patterns as close as is possible to excitation coil connecting leads. By so configuring the offset coil patterns, an offset signal can be generated that is not influenced by or coupled to the rotor 118 and can be used to determine the direct couplings induced in the sine and cosine signals by the excitation coil leads, as such signal are respectively induced in each of the receiving coil connecting leads, e.g., leads 108-1 to 108-3, and the IC 322 can accordingly offset such values. For at least one embodiment, it is desirable for the offset coil, as formed by the offset coil patterns, be drawn as close as is possible to the excitation coil connecting leads.

Figure 4:
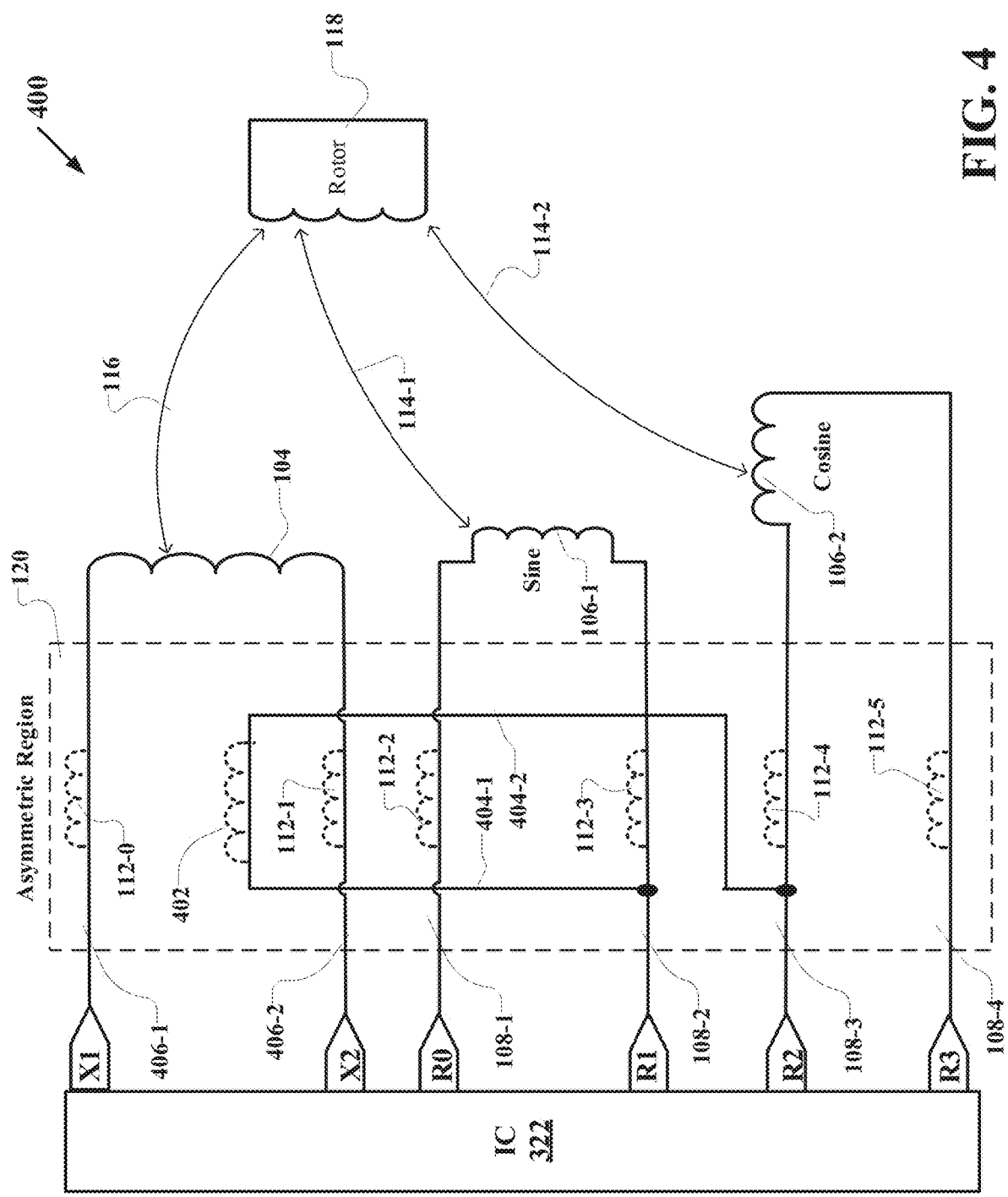
FIG. 4 is a schematic representation of an inductive sensor configured for use with a two-phase differential coupling receiving coil and configured to determine offsets generated or each receiving coil and in accordance with at least one embodiment of the present disclosure.

As shown in FIG. 4, an embodiment of the present invention for a two-phase differential sensor 400 includes use of an offset coil 402 formed by offset coil patterns 404-1 and 404-2 being drawn substantially perpendicularly through the PCB materials forming a stator. For the two-phase differential sensor 400, the first receiving coil 106-1 may be configured to have a sine orientation relative to the rotor 118 position, while the second receiving coil 106-2 may be configured to have a cosine orientation relative to the rotor 118 position. It is to be appreciated that the distances between the excitation coil 104 and the connecting leads 108-1 to 108-4 for the receiving coils are each different. Accordingly, differing respective offset voltages will be induced at each of the terminals to the IC 322 for the receiving coils and the direct couplings formed (field lines for the direct couplings are not shown) are illustrated in FIG. 4 as arising between illustrative inductors 112-0 to 112-5. In accordance with at least one embodiment, the same IC 322 may be used to provide analog and digital signal processing for signals arising from and being provided to the IC in either two-phase or three-phase inductive sensor systems; such systems having various receiving coil configurations.

The offset coil patterns 404-1 and 404-2 are connected to terminals R1 and R2 of the IC 322 and respectively provide the IC with voltage signals for each of the sine responsive signal, as detected by the first receiving coil 106-1, and the cosine responsive signal, as detected by the second receiving coil 106-2. By so connecting the offset coil patterns 404-1 and 404-2 to receiving coil connecting leads 108-2 and 108-3, the induced offset voltages arising from the direct coupling of the excitation coil with each receiving coil in the asymmetric region can be detected and determined. Contrarily, connecting the offset coil in parallel with either of the first or second receiving coils may result in an offset signal that is difficult, it at all, to discriminate from a respectively received receiver signal. Accordingly, for at least one embodiment, the offset coil patterns 404-1 and 404-2 may be connected so as to be not in parallel with any single receive coil's connecting leads, such as leads 108-1 to 108-4.

Figure 5:
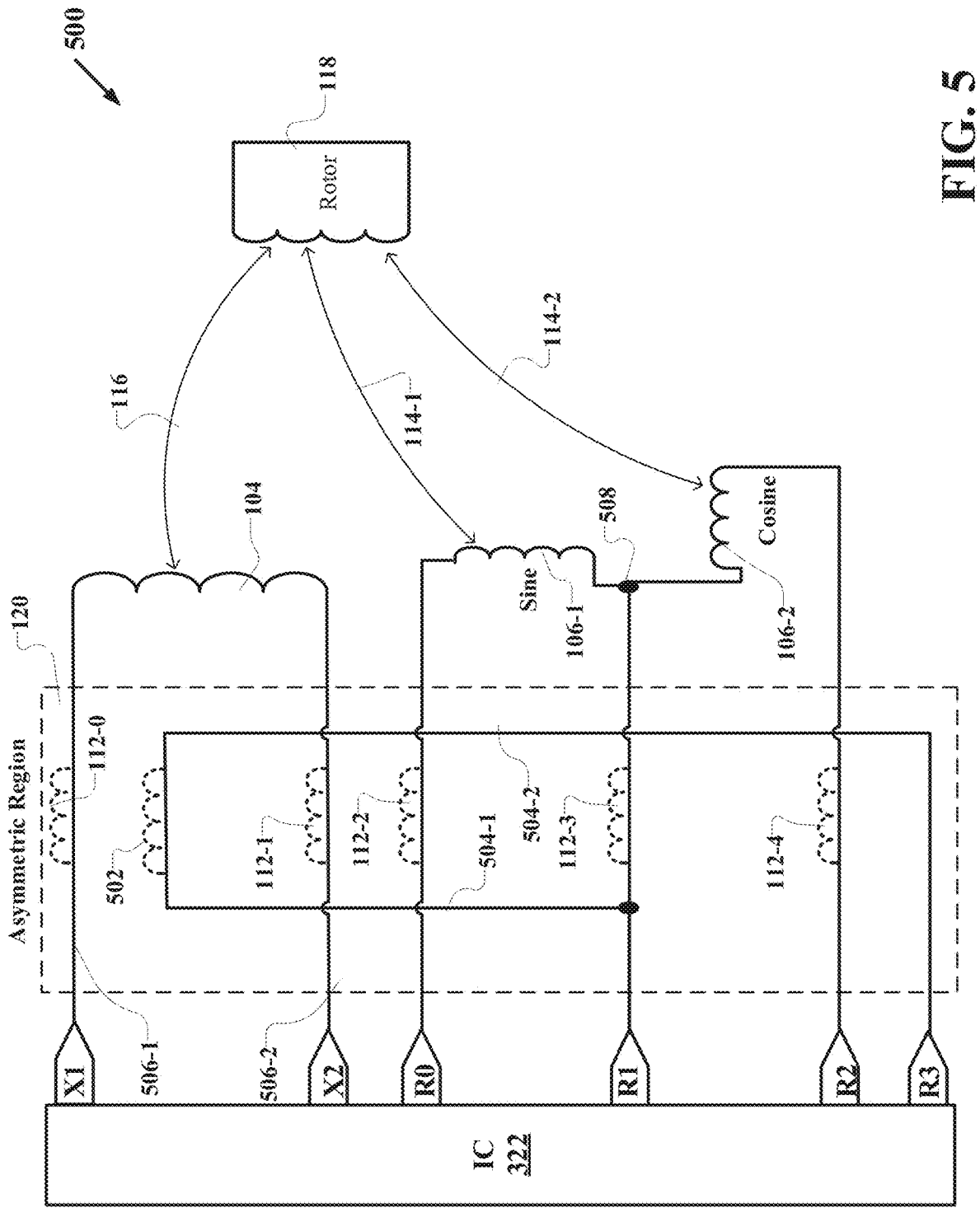
FIG. 5 is a schematic representation of an inductive sensor configured for use with a two-phase single ended coupling coil to determine offsets generated for each receiving coil and in accordance with at least one embodiment of the present disclosure.

As shown in FIG. 5, the various embodiments of the present disclosure may also be utilized in conjunction with a two-phase single ended inductive sensor 500. As shown, the sensor 500 may be configured such that the first and second receiving coils 106-1 and 106-2 share a common node 508 connected to the IC 322, such as by terminal R1 of the IC 322. As further shown, offset coil leads 504-1 and 504-2 are configured to form an offset coil 502 that is configured to be in close proximity to the excitation coil 112-0 formed by and arising from the excitation coil connecting leads 506 connecting the IC 322 to the excitation coil 104. For at least one embodiment, the offset coil leads 504-1 and 504-2 may be configured to sense voltages arising across the common node 508 connection to the IC 322, such as a pin R1, and across an additional pin, R3, of the IC 322 that is not utilized by the two-phase single ended inductive sensor 500 configuration.

Figure 6:
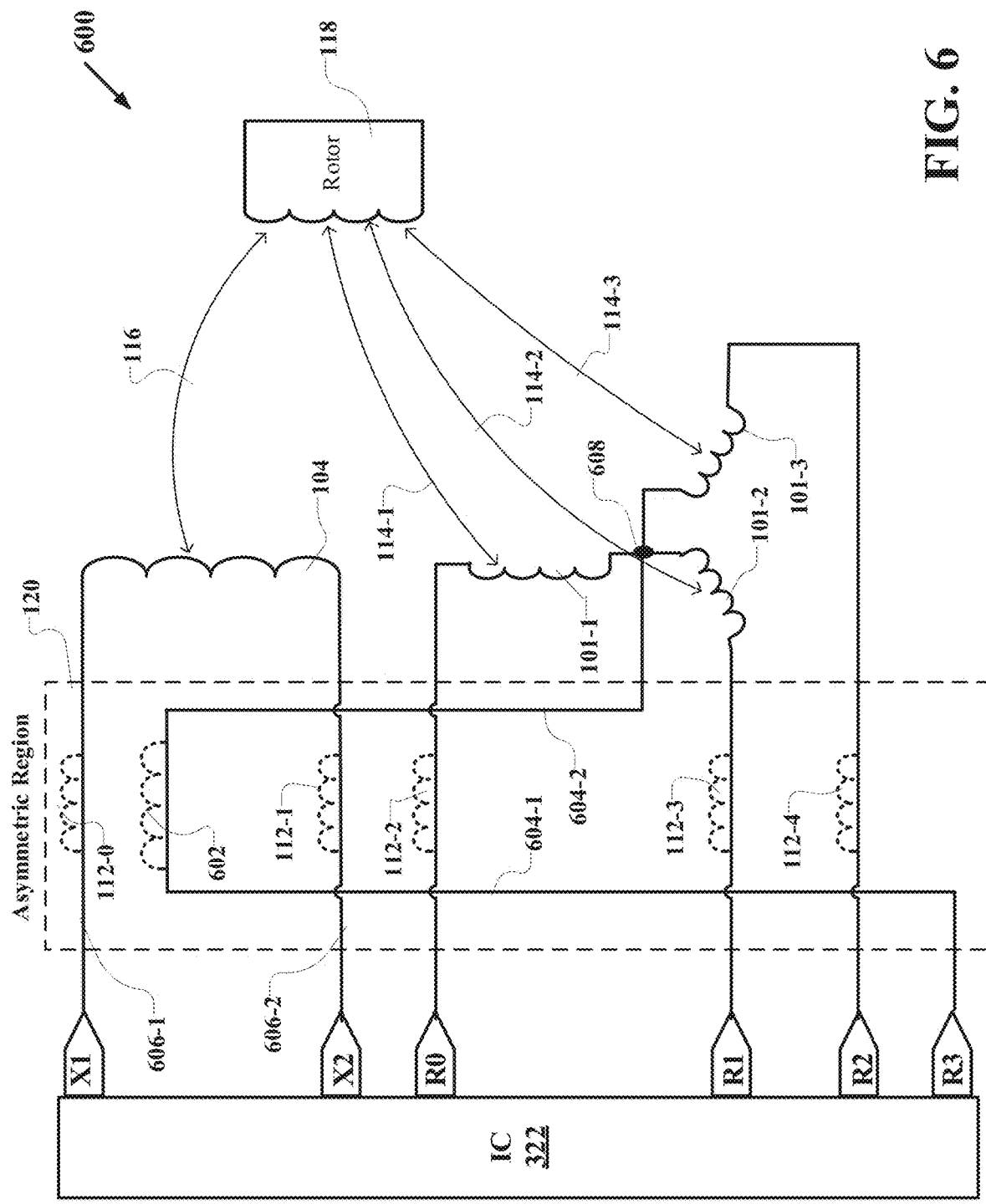
FIG. 6 is a schematic representation of an inductive sensor configured for use with a three-phase offset to neutral coupling coil to determine offsets generated for each receiving coil and in accordance with at least one embodiment of the present disclosure.

As shown in FIG. 6, the various embodiments of the present disclosure may also be utilized in conjunction with a three-phase system such as the three-phase offset neutral sensor 600. As shown, the sensor 600 may be configured such that each of the first, second and third receiving coils, 106-1 to 106-3, share a common node 608. As shown, the common node 608 is not connected to the IC 322. As further shown, offset coil leads 604-1 and 604-2 are configured to form an offset coil 602 that is configured to be in close proximity to the excitation coil 112-0 formed by and arising from the excitation coil connecting leads 606 connecting the IC 322 to the excitation coil 104. For at least one embodiment, the offset coil leads 604-1 and 604-2 may be configured to sense voltages arising across the common node 608 connection to the IC 322 and across an additional pin, R3, of the IC that is not utilized by the sensor 600 configuration.

Figure 7:
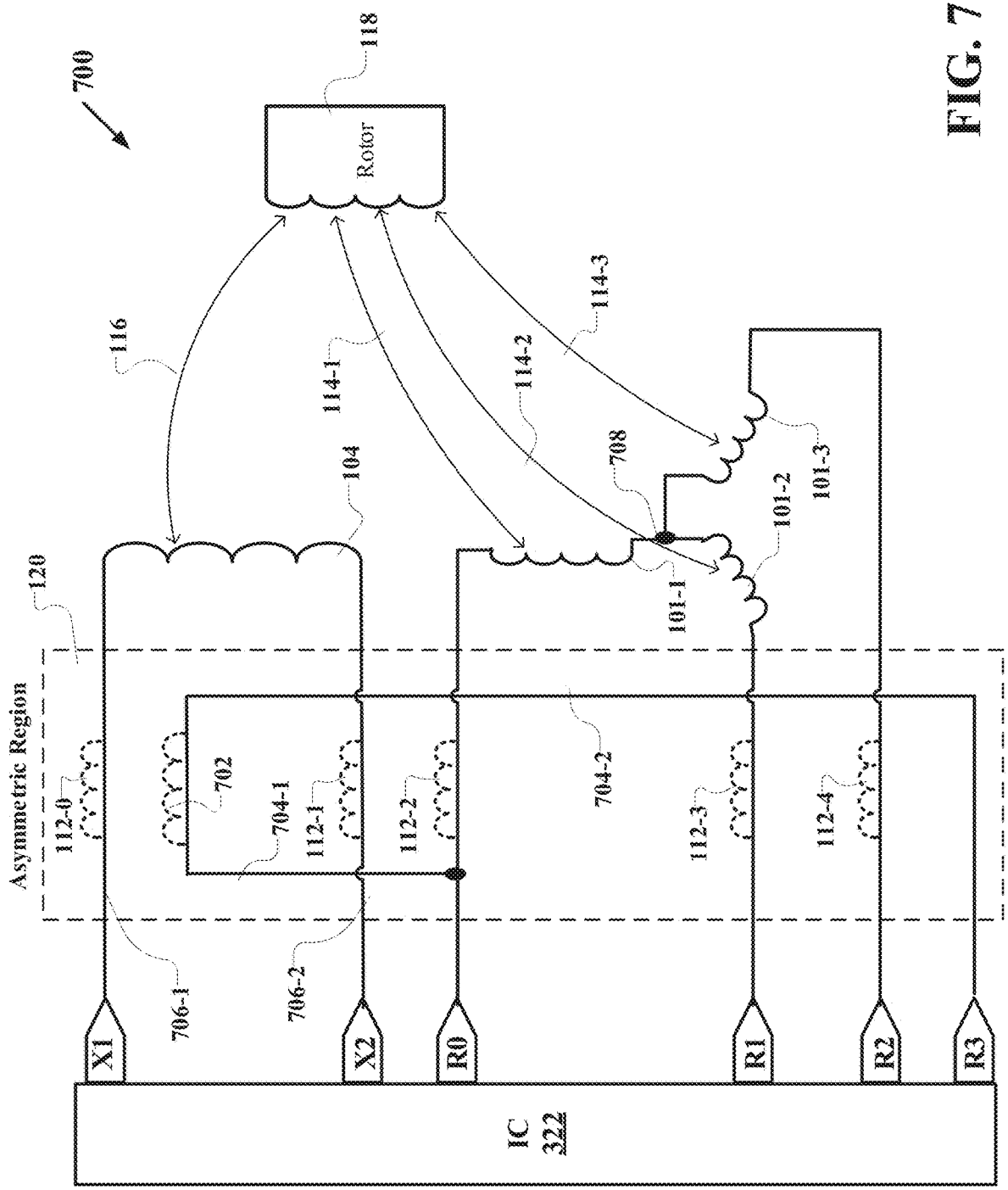
FIG. 7 is a schematic representation of an inductive sensor configured for use with a three-phase offset to first-phase coupling coil to determine offsets generated for each receiving coil and in accordance with at least one embodiment of the present disclosure.

As shown in FIG. 7, the various embodiments of the present disclosure may also be utilized in conjunction with a three-phase system such as the three-phase offset to first phase sensor 700. As shown, the sensor 700 may be configured such that each of the first, second and third receiving coils, 106-1 to 106-3, share a common node 708. As shown, the common node 708 is not connected to the IC 322. As further shown, offset coil leads 704-1 and 704-2 are configured to form an offset coil 702 that is configured to be in close proximity to the excitation coil 112-0 formed by and arising from the excitation coil connecting leads 706-1 and 706-2 connecting the IC 322 to the excitation coil 104. For at least one embodiment, the offset coil leads 704-1 and 704-2 may be configured to sense voltages arising across a single coil, and not across the common node 708, such as by having one connection to the IC 322 be across a pin connecting to a receiving coil, such as pins R0, R1 and R2 (with a connection to pin R0 being shown in FIG. 7), while the second offset coil lead is connected to additional pin R3 of the IC 322, a pin that is not utilized by the sensor 700 configuration. It is to be appreciated that by utilizing the pin R3 which is not connected to a receiving coil, shorting of the offset coil 702 with one of the receiving coils can be avoided.

Further, for at least one embodiment of the present disclosure, the voltage amplitude induced in each receiving coil and in the offset coil will desirably be proportional to the current through the excitation coil. However, in resonant circuits, the excitation current is not totally proportional to the voltages generated thereby as the quality of the resonator may influence the amplitude of the current. Further, for high quality oscillators, the current will often be very high and the voltages low, whereas for other resonators, lower currents may result in higher voltages. Likewise, changes in the operating temperature may result in the electrical resistance of the traces drawn in the PCB changing and thereby affecting the voltages induced in the circuits. Thus, per at least one embodiment, these concerns are addressed by measuring the excitation currents and compensating for the offset amplitudes accordingly. Further, the various embodiments of the present disclosure utilize the same signal paths and amplitude gains to compensate for the offset amplitudes and provide a more accurate result.

In accordance with at least one embodiment, the received voltage signals for a given receiving coil "i" may be defined in accordance with Equation 1.

$$V_i = [A_i \sin(\alpha + i^* + \delta) + B_i] \omega I_x \qquad \text{Equation 1}$$

where:
i=0 or 1, for a two-phase system;
   0, 1, or 2 for a three-phase system;
$A_i$=the core mutual inductance between phase i and the excitation coil (via the rotor coupling);
α=the unknown rotor's angular position;
δ=90 for a two-phase system;
   120 for a three-phase system;
$B_i$=the direct coupling mutual inductance between phase i and the excitation coil; and
$I_x$=the current flowing through the excitation coil at a frequency of ω/2π.

It is to be appreciated, that $A_i$ is typically a constant and is a function of the geometry used by the sensor designer and the air gap arising between the rotor and the rotor facing stator surface. The air gap is typically constant across all of the receiver coils and can typically be ignored for purposes of the present disclosure. Further, as the current $I_x$ flowing through the excitation coil increases, the received voltage $V_i$ increases. Accordingly, the received voltage is proportional to the current through the excitation coil.

In accordance with at least one embodiment, the received voltage signals for offset coil may be defined in accordance with Equation 2.

$$V_{offset} = [A_{offset} \sin(\alpha + \delta_{offset}) + B_{offset}] \omega I_x \qquad \text{Equation 2}$$

where:
$A_{offset}$=as small as possible (ideally, is zero);
$B_{offset}$=comparable to Ai (same gain is used); and
$\delta_{offset}$=a constant.

It is to be appreciated, that $A_{offset}$ can be made small and non-significant when the configuration of the offset coil, as formed by the offset coil patterns 304, is drawn perpendicularly to the excitation coil 104 (as distinguished from the excitation coil connecting leads 306). For at least one embodiment, $A_{offset}$ is no more than ten percent of $B_{offset}$. Further, $B_{offset}$ can be made significant by having the offset coil patterns 304-1 and 304-2 drawn as close to the excitation coil connecting leads 306-1 and 306-2 as is possible, as illustrated for example in FIG. 3. It is to be appreciated that the offset coil formed by the offset coil patterns 304 will often not be aligned with the rotor's zero position. Hence, $A_{offset}$ will typically depend on the geometry, but, is typically considered to be negligible given that $A_{offset}$ is typically negligible in comparison to $B_{offset}$. Accordingly, Equation 2 can be expressed as, per Equation 3 below, as a function of the excitation current $I_x$ and the direct coupling mutual inductance $B_{offset}$ arising between the offset coil patterns 304-1 and 304-2 and the excitation coil connecting leads 306-1 and 306-2.

$$V_{offset} \approx [B_{offset} * \omega * I_x] \qquad \text{Equation 3}$$

Referring again to FIGS. 4 and 5 for a two-phase system and FIGS. 6 and 7 for a three-phase system, an IC 322 will receive voltage signals on the respectively connected terminals, from which a measured amplitude can be determined. Further, differences "Δy" between amplitudes measured on a first terminal versus those measured on a second terminal can be identified in a programmable table and later measured. For example, for a two-phase system, the following sets of amplitude differences, each a Δy, can be measured: R0 to R1, R1 to R2 and R2 to R3. Likewise, for a three-phase system, the following set of amplitude differences can be measured: R0 to R1, R1 to R2, R2 to R0, and R3 to R0. These measured differences can be used by the IC 322 to determine the offset voltage and thereby the direct couplings arising in the asymmetric region between the excitation coil and the receiving coils.

Further, the various embodiments facilitate use of an IC 322 that is backward compatible for use with inductive sensors that do not include or utilize an offset coil. Accordingly, it is to be appreciated that at least one embodiment of the present disclosure facilitates the use of ICs compatible with inductive sensors that include or do not include offset coils.

More specifically, after the IC 322 receives the voltages sensed for each of the differences Δy, Equations 4, 5 and 6 can be used to determine the rotor position.

$$\alpha = \tan^{-1}(A/B) \qquad \text{Equation 4}$$

$$A = \Sigma N_y \Delta_y \qquad \text{Equation 5}$$

$$B = \Sigma D_y \Delta_y \qquad \text{Equation 6}$$

where:
$\Delta_y$=the amplitude difference between voltages measured at each set y of two different receiving terminals of the IC;
$N_y$=programmable coefficients; and
$D_y$=programmable coefficients.

It is to be appreciated that based on Equations 4 to 6, a series of linear combinations for the first argument A and for the second argument B arise. By selecting an appropriate programmable coefficient Ny and Dy for the parameters $N_{offset}$ and $D_{offset}$, the coefficients corresponding to the offset voltage values associated with the direct coupling of the receiving coil with the excitation could can be subtracted out of the calculated values for A and B and the rotor position α can determined absent any errors arising due to the direct coupling and the offset voltages induced thereby.

Figure 8A:
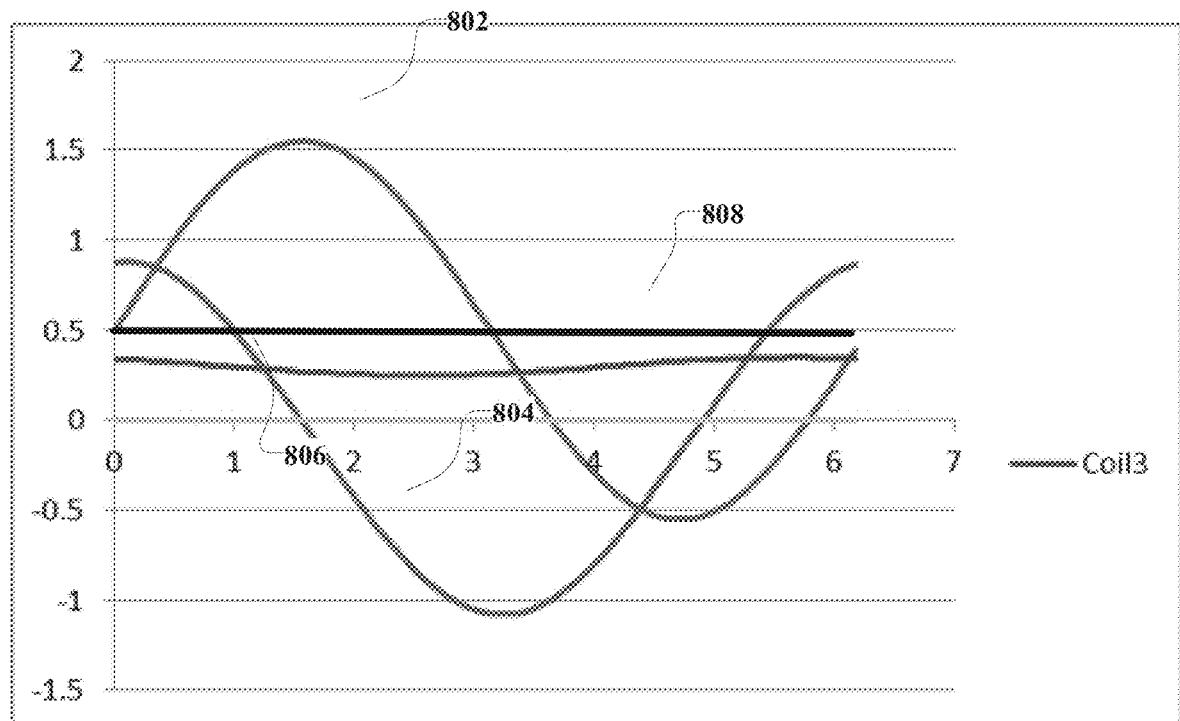
FIG. 8A is a graph depicting the offset induced voltage and rotor induced voltages for each receiving coil of a simulated two-phase inductive sensor and in accordance with at least one embodiment of the present disclosure.

Further, when the rotor is assembled on top of the sensor, for example, during production, all of the voltages induced across a full 360 degrees of angular positions of the rotor respective to each receiving coil can be determined. Examples of such voltages induced are shown in FIG. 8A for a two-phase system, and in FIG. 9A for a three-phase system. Specifically, in FIG. 8A, voltages are depicted for a simulated first coil signal 802, a second coil signal 804, a non-used third coil signal 806, and an offset coil signal 808, wherein $A_0=1.05$, $A_1=0.98$, $A_2=0$ (not used), $A_{offset}=0.05$, $B_0=0.5$, $B_1=-0.1$, $B_2=0$ (not used), and $B_{offset}=0.3$. Likewise, in FIG. 9A voltages are depicted for a first coil signal 902, a second coil signal 904, a third coil signal 906, and an offset coil signal 908, wherein $A_0=1.01$, $A_1=0.98$, $A_2=1$, $A_{offset}=0.05$, $B_0=0.5$, $B_1=-0.1$, $B_2=-0.15$, and $B_{offset}=0.3$.

As shown in FIG. 8A, the maximum amplitude of each phase is shifted by 90 degrees horizontally and vertically by the value of the offset coil signal 808.

Figure 9A:
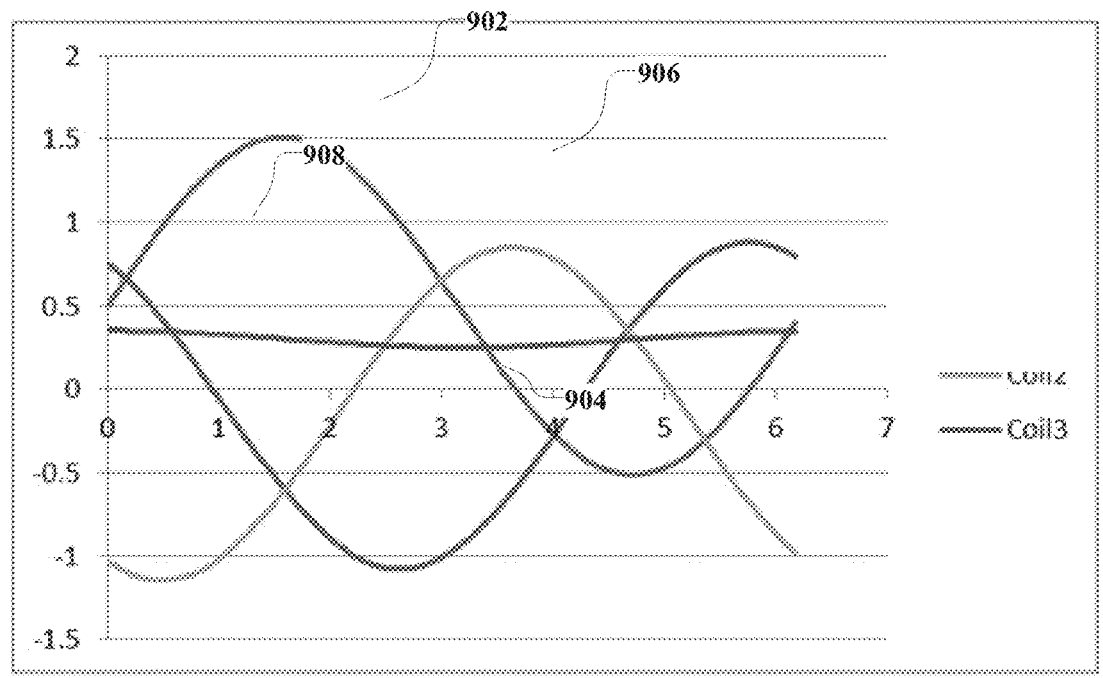
FIG. 9A is a graph depicting the offset induced voltage and rotor induced voltages for each receiving coil of a simulated three-phase inductive sensor and in accordance with at least one embodiment of the present disclosure.

As shown in FIG. 9A, the maximum amplitude of each phase is shifted by 120 degrees horizontally and vertically by the value of the offset coil signal 908. Ideally, the value of the offset coil signal 808/908 is neither too high, relative to the highest maximum amplitude for the phases, nor too low relative to the lowest minimum amplitude for the phases. It being appreciated that a high reading of an offset coil amplitude, relative to such maximum amplitudes, may result in an over-driving of the IC and a too low reading of an offset coil amplitude, relative to such minimum amplitudes, may result in a lack of resolution.

Figure 8B:
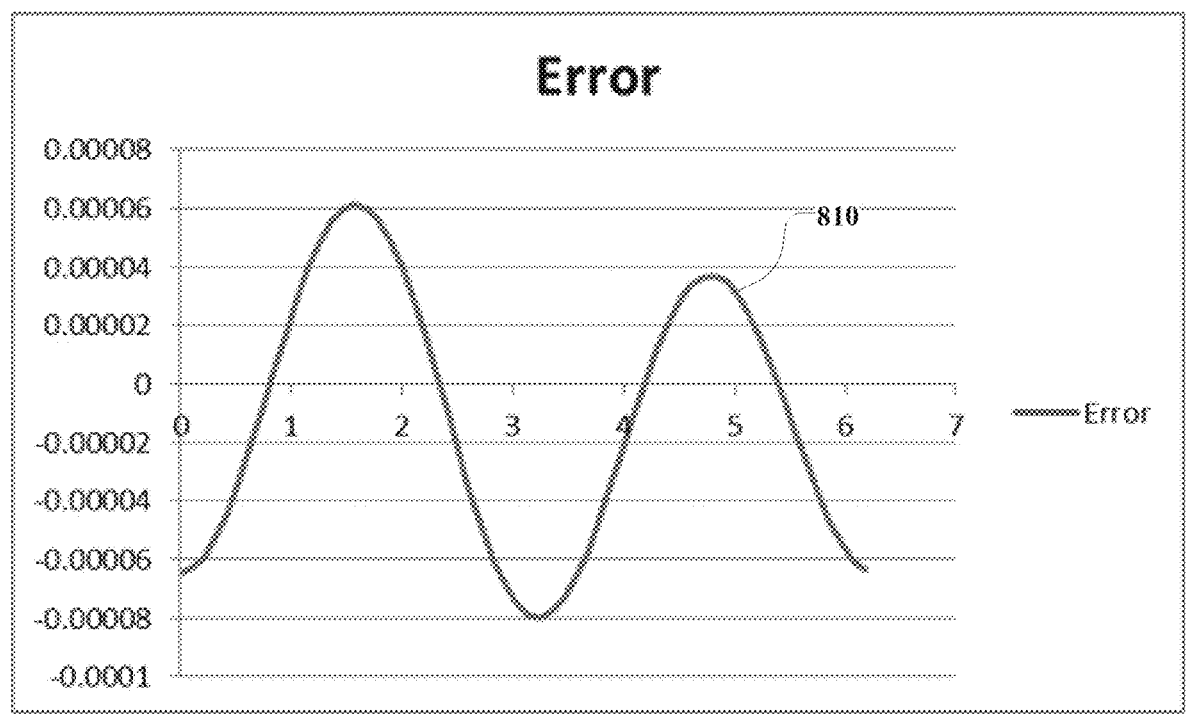
FIG. 8B is a graph depicting the resulting position error signal for the simulated two-phase inductive sensor of FIG. 8A and in accordance with at least one embodiment of the present disclosure.
Figure 9B:
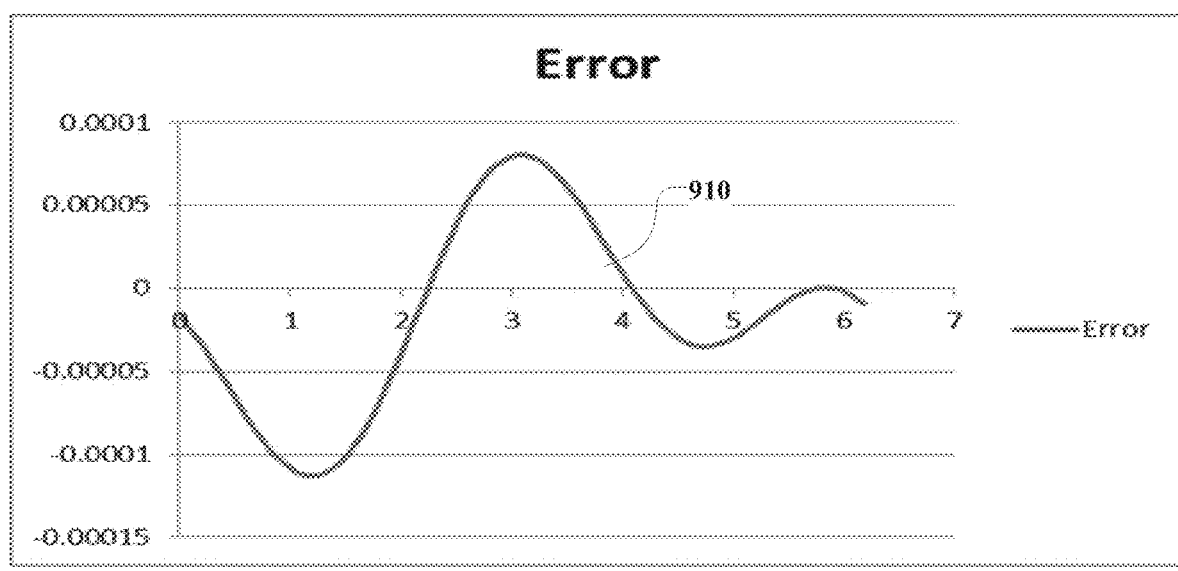
FIG. 9B is a graph depicting the resulting position error signal for the simulated three-phase inductive sensor of FIG. 9A and in accordance with at least one embodiment of the present disclosure.

Each of the detected values, for each phase, may then be provided to an optimizer computer program executing on a computer processor. The optimizer calculates the coefficients $N_y$ and $D_y$ which will result in the least error being generated over a full range of motion for the rotor, such as from 0 to 6.28 radians which equates to 0 to 360 degrees. Examples of such errors are shown in FIGS. 8B and 9B. The operation and use of optimizer programs is well known in the art. It is to be appreciated that with optimization, variances in the offset signal can be accounted and those coefficients $N_y$ and $D_y$ which minimize the error can be determined. In the simulation of FIG. 8A, such coefficients are $N_0=0.1675$, $N_1=0.9872$, $N_2=0$ (not used), $N_{offset}=0.0499$, $D_0=0.8937$, $D_1=0.1999$, $D_2=0$ (not used), and $D_{offset}=1.5561$. In the simulation of FIG. 9A, such coefficients are $N_0=0.102$, $N_1=0.0148$, $N_2=-0.5335$, $N_{offset}=-1.3625$, $D_0=-0.1749$, $D_1=0.4704$, $D_2=0.0477$, and $D_{offset}=0.3749$. Based on these values, the optimizer can adjust for offset signals, and differences in the amplitude gains of the different coils (such as those arising between the peak values of the first coil versus the second coil, etc.). Gain differences can be accommodated in the IC 322 by digital signal processing gain adjustments.

As further shown in the simulation of FIG. 8A, the shift between the sine signals, as represented by the first coil signal 802, and the cosine signals, as represented by the second coil signal 804, is approximately 85-degrees versus the desired 90-degree shift. This 5-degree shift error corresponds to an orthogonality error and can be compensated for using the optimizer process. Similarly, in FIG. 9A, a 2-degree orthogonality error is depicted for the third coil signal 906.

It is also to be appreciated, that the zero-rotor position can also be determined based upon the measured signals. For example, for the simulation of FIG. 8A, the optimizer can determine that the zero-rotor position should be at 75-degrees, and for the simulation of FIG. 9A, the zero-rotor position should be at 20-degrees.

Accordingly, various embodiments of an inductive sensor are described. One or more of such embodiments may be configured for use as a rotational, linear, and/or torque sensor. Further, methods of manufacturing of one or more embodiments of the inductive sensors may be used in accordance with known and/or future arising manufacturing principles and materials. Further, use of an inductive sensor according to an embodiment of the present disclosure may arise in conjunction with any known or future arising uses.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "about", "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "before", "after", and other similar terms are used for description and ease of reference purposes only and are not intended to be limiting to any orientation or configuration of any elements or sequences of operations for the various embodiments of the present disclosure. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. An inductive sensor, comprising:
    a rotor; and
    a stator comprising:
        an excitation coil electrically connected to an integrated circuit by excitation coil connecting leads;
        a first receiver coil electrically connected to the integrated circuit by a first set of receiving coil connecting leads;
        a second receiver coil electrically connected to the integrated circuit by a second set of receiving coil connecting leads; and
        an offset coil pattern forming an offset coil electrically connected to the integrated circuit;
    wherein, during operation of the inductive sensor:
        a first inductive coupling arises between the rotor and the excitation coil;
        a second inductive coupling arises between the rotor and the first receiver coil;
        a third inductive coupling arises between the rotor and the second receiver coil;
        an asymmetric region is formed on the stator,
        wherein and within the asymmetric region, a first direct coupling arises between the first set of receiving coil connecting leads and the excitation coil;

a second direct coupling arises between the second set of receiving coil connecting leads and the excitation coil; and an offset coupling arises between the offset coil pattern and the excitation coil connecting leads.

2. The inductive sensor of claim 1, wherein the integrated circuit includes four terminals; and wherein the first set of receiving coil connecting leads and the second set of receiving coil connecting leads are connected to unique sets of two of the four terminals.

3. The inductive sensor of claim 1, wherein the integrated circuit includes four terminals; and wherein the offset coil pattern is uniquely connected to two of the four terminals.

4. The inductive sensor of claim 1, wherein the integrated circuit includes four receiving terminals; and wherein the first receiving coil, the second receiving coil and the offset coil are electrically connected to the four receiving terminals using a configuration comprising one of:

a first configuration, wherein the first receiving coil and the offset coil are electrically connected to a second of the four receiving terminals; and wherein the second receiving coil and the offset coil are electrically connected to a third of the four receiving terminals; and a second configuration, wherein the first receiving coil, the second receiving coil, and the offset coil, at a common node, are electrically connected to the second of the four receiving terminals; and wherein the offset coil is electrically connected to a fourth of the four receiving terminals.

5. The inductive sensor of claim 4, wherein the first configuration provides a differential sensor configuration and the second configuration provides a single ended inductive sensor configuration.

6. The inductive sensor of claim 4, wherein the integrated circuit is configured to:

receive a first signal at a first of the four receiving terminals;

receive a second signal at the second of the four receiving terminals;

receive a third signal at the third of the four receiving terminals;

receive a fourth signal at the fourth of the four receiving terminals;

wherein, for the first configuration, the first signal versus the second signal indicates a first difference induced in the first receiving coil by the second inductive coupling and the first direct coupling;

the third signal versus the fourth signal indicates a second difference induced in the second receiving coil by the third inductive coupling and the second direct coupling; and the second signal versus the third signal indicates an offset difference induced by the offset coupling; and wherein, for the second configuration, the first signal versus the second signal indicates the first difference;

the second signal versus the third signal indicates the second difference; and the second signal versus the fourth signal indicates the offset difference.

7. The inductive sensor of claim 6, wherein the integrated circuit is further configured to:

determine a then arising position of the rotor based on an equation;

wherein a first argument of the equation is a summation of a first weighting times the first difference, a second weighting times the second difference, and a third weighting times the offset difference; and wherein a second argument of the equation is a summation of a fourth weighting times the first difference, a fifth weighting times the second difference, and a sixth weighting times the offset difference.

8. The inductive sensor of claim 7, wherein each of the first weighting, second weighting, third weighting, fourth weighting, fifth weighting and sixth weighting are optimized constants determined, over a full range of motion associated with the rotor, based upon a plurality of first voltages induced in the first receiving coil, a plurality of second voltages induced in the second receiving coil, and a plurality of offset voltages induced in the offset coil.

9. The inductive sensor of claim 8, wherein each of the plurality of first voltages and second voltages are a function of rotor position.

10. The inductive sensor of claim 9, wherein rotor position has an insubstantial influence on each of the plurality of offset voltages; and wherein the offset coupling has a dominant influence on each of the plurality of offset voltages.

11. The inductive sensor of claim 1, wherein the offset coil pattern comprises a double barrel pattern.

12. The inductive sensor of claim 1, wherein the offset coil pattern comprises a twisted loop pattern.

13. An inductive sensor, comprising:

a stator having a rotor facing surface;

excitation coil connecting leads drawn and extending within the stator on a first plane substantially parallel to the rotor facing surface; and an offset coil comprising:

a first offset coil pattern drawn and extending within the stator on at least one second plane substantially parallel with the first plane.

14. The inductive sensor of claim 13, wherein the excitation coil connecting leads comprise a twisted configuration; and wherein the first offset coil pattern comprises a twisted loop configuration.

15. The inductive sensor of claim 14, wherein the excitation coil connecting leads electrically connect an integrated circuit to an excitation coil drawn on the stator.

16. The inductive sensor of claim 15, wherein the stator further comprises:

a first receiving coil electrically connected to the integrated circuit by a first set of terminals selected from a group of receiving coil terminals comprising a first receiving coil terminal, a second receiving coil terminal, a third receiving coil terminal, and a fourth receiving coil terminal;

a second receiving coil electrically connected to the integrated circuit by a second set of terminals selected from the group of receiving coil terminals; and wherein the first offset coil pattern is connected to the integrated circuit using a third set of terminals selected from the group of receiving coil terminals.

17. The inductive sensor of claim 16, wherein each of the first set of terminals, the second set of terminals and the third set of terminals utilize a common terminal selected from the group of receiving coil terminals.

18. The inductive sensor of claim 13, wherein the offset coil comprises:

a second offset coil pattern drawn and extending within the stator on at least one third plane substantially parallel with the first plane;

wherein the first offset coil pattern is electrically coupled to the second offset coil pattern to form a double loop offset coil pattern.

19. An offset coil, for use within an inductive sensor, comprising:

a first offset coil trace and at least one second offset coil trace drawn and extending within a stator of an inductive sensor;

wherein the inductive sensor comprises a pair of excitation coil connecting leads drawn and extending on a first plane within the stator;

wherein the first offset coil trace and the at least one second offset coil trace are drawn on at least one second plane, within the stator, substantially parallel to the first plane; and wherein the first offset coil trace and the at least one second offset coil trace are drawn proximate to the pair of excitation coil connecting leads such that an excitation coil current in the pair of excitation coil connecting leads induces an offset coil signal in the first trace and the at least one second trace.

20. The offset coil of claim 19, wherein the first trace and the at least one second trace form an offset coil pattern configured into at least one of a double barrel loop configuration and a twisted loop configuration.

* * * * *